United States Patent [19]

Yamashita et al.

[11] Patent Number: 4,709,123

[45] Date of Patent: Nov. 24, 1987

[54] ELECTRIC COMPONENT FOR MOTOR VEHICLES

[75] Inventors: Akihiko Yamashita, Saitama; Masahiko Ikegami, Tokyo; Kaoru Hatanaka, Saitama, all of Japan

[73] Assignee: Honda Giken Kogyo Kabushiki Kaisha, Tokyo, Japan

[21] Appl. No.: 775,964

[22] Filed: Sep. 13, 1985

[30] Foreign Application Priority Data

Sep. 13, 1984 [JP] Japan ................................ 59-140140

[51] Int. Cl.$^4$ .................... H01H 50/04; H01H 50/12; H01H 9/04
[52] U.S. Cl. ................................ 174/52 R; 174/17 V; 174/17 A; 200/302.1; 200/306; 335/202; 439/282
[58] Field of Search ................. 174/52 R, 52 P, 52 E, 174/138 F, 17 V, 17 A; 200/302, 1, 306; 339/116 R, 116 C, 102 R, 101, 112 R; 138/26; 335/278, 202

[56] References Cited

U.S. PATENT DOCUMENTS 3,944,774  3/1976  Noba et al. .......................... 200/306
4,567,457  1/1986  Schedele et al. .................... 335/202

FOREIGN PATENT DOCUMENTS 1402895  2/1964  France ............................ 339/112 R Primary Examiner—Arthur T. Grimley
Attorney, Agent, or Firm—Armstrong, Nikaido, Marmelstein & Kubovcik

[57] ABSTRACT

An electric component for use in a motor vehicle has a casing accommodating an electric circuit therein, and a terminal holder mounted in the casing in covering relation to the open end thereof and supporting electric terminals from the electric circuit for connection to wires. The terminal holder has a tubular member projecting outwardly from the casing and vent holes defined in the tubular member for communication between the space in the casing and the exterior thereof. The tubular member is covered with a cover which provides communication between the vent holes and the exterior only when there is a pressure difference developed between the space in the casing and the exterior thereof.

4 Claims, 11 Drawing Figures

ELECTRIC COMPONENT FOR MOTOR VEHICLES

BACKGROUND OF THE INVENTION

The present invention relates to an electric component, and more particularly to an electric component for use in motor vehicles which has a portion that will be heated when in use.

Electric components such as a relay which have a portion that will be heated in use include a casing which houses an electric circuit, the casing having a vent hole in view of the expansion and contraction of air in the casing arising from the heating and cooling of the heatable portion. As is well known, salt is sprinkled over roads in cold areas during the winter to prevent the road surfaces from being frozen. The salt thus scattered over a road tends to enter the casings of electronic components in a motor vehicle when the motor vehicle runs on the salted road. When this happens, the circuit in the casing is highly liable to become corroded due to deliquescence of the salt, and the electric component will have a reduced service life.

The present invention has been made in an effort to eliminate the foregoing problem of the conventional electric components.

SUMMARY OF THE INVENTION

Therefore, it is an object of the present invention to provide an electric component for use in motor vehicles which is capable of substantially protecting its circuit from salt-induced damage.

According to the present invention, the above object can be achieved by an electric component for use in a motor vehicle, comprising a casing having an opening in one end thereof and an interior space therein, an electric circuit disposed in the interior space of the casing, at least one electric terminal connected to the electric circuit, a terminal holder fixedly mounted in the opening in closing relation thereto and supporting the electric terminal for connection to at least one wire, the terminal holder having a tubular member projecting outwardly from the casing, and a vent passage defined within the tubular member and providing communication between the interior space of the casing and the exterior of the casing.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 10:
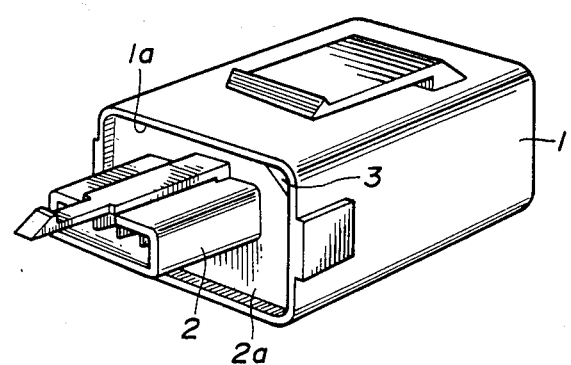
FIG. 10 is a perspective view of a conventional electric component having a vent hole in a casing thereof.

FIG. 10 shows a conventional electric component currently for use in mass-produced motor vehicles. The illustrated prior electric component includes a casing 1 accommodating an electric circuit therein and having an opening 1a closed off by a board 2a having a terminal 2. The electric component has a vent hole 3 formed by cutting off a corner of the board 2a. The vent hole 3 permits salt to enter the casing 1 therethrough to damage the circuit in the casing 1.

Figure 1:
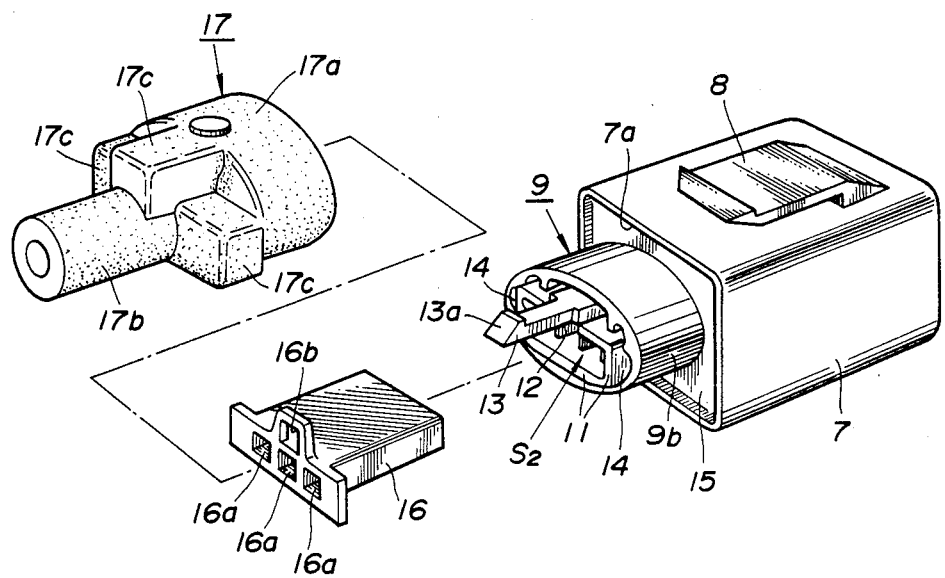
FIG. 1 is an exploded perspective view of an electric component according to the present invention.

An electric component according to the present invention for use in a motor vehicle is illustrated in FIGS. 1 through 9. As shown in FIG. 1, the electric component includes a casing 7 in the form of a rectangular parallelepiped having an opening 7a in one end thereof. In this embodiment, a flasher relay circuit is disposed in the space $S_1$ (FIG. 3) in the casing 7. More specifically, a circuit board supporting the flasher relay circuit is accommodated in the casing 7. The casing 7 has an upper panel on which there is mounted a hook 8 for attaching the casing 7 to the motor vehicle.

Figure 2:
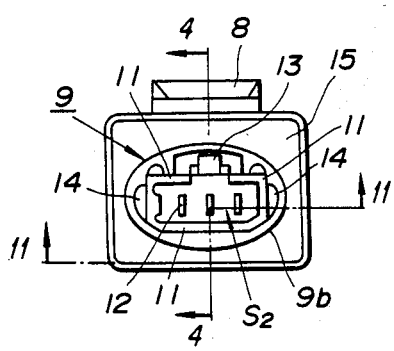
FIG. 2 is a front elevational view of a casing having a terminal holder.
Figure 3:
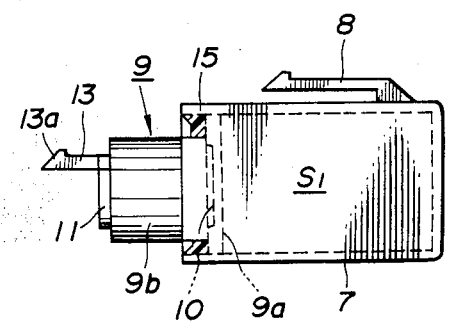
FIG. 3 is a side elevational view of the casing, showing an internal construction thereof.
Figure 4:
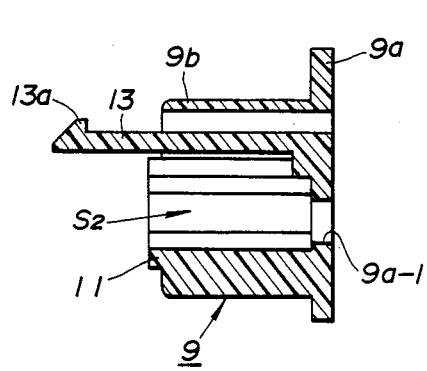
FIG. 4 is a cross-sectional view taken along line 4—4 of FIG. 2, the view showing the terminal holder.
Figure 11:
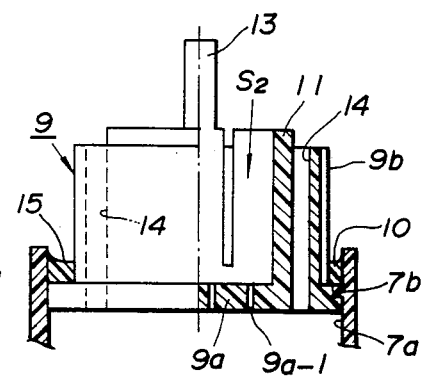
FIG. 11 is a cross-sectional view taken along line 11—11 of FIG. 2.

A terminal holder 9 is mounted in the opening 7a in closing relation thereto and supports three electric terminals 12 extending from the flasher relay circuit for connection to outer electric wires. The terminal holder 9 is composed of a board 9a (FIG. 3) positioned in the casing 7 and shaped in complementary relation to the opening 7a, and a tubular member 9b projecting outwardly from the board 9a and having an outer profile which is substantially elliptical. As illustrated in FIG. 11, the board 9a has engagement grooves 10 defined in its shorter sides. The board 9a can be fitted in the opening 7a by bringing ridges 7b which are formed on the casing 7 near the opening 7a into the respective engagement grooves 10. As illustrated in FIGS. 2 and 4, a terminal space $S_2$ is defined by a partition 11 in the tubular member 9b, the terminal space $S_2$ opening outwardly. The three electric terminals 12 connected to the circuit in the casing 7 are disposed in the terminal space $S_2$. The partition 11 has a coupling arm 13 on its upper side (FIG. 2), which projects out of the tubular member 9b and has a hook 13a on its distal end. Vent holes 14 are defined along outer surfaces of the partition 11 and positioned on opposite sides thereof. The interior of the casing 7 is therefore held in communication with the exterior thereof through the vent holes 14.

After the terminal holder 9 has been mounted in the opening 7a of the casing 7, a mass 15 of epoxy resin is packed between the board 9a and the casing 7 and applied to the outer surface of the board 9a to seal the interior of the casing 7 while leaving communication through the vent holes 14.

A female coupler 16 (FIG. 1) made of synthetic resin is inserted in the terminal space $S_2$ to position the electric terminals 12 fitted respectively in holes 16a defined in the coupler 16. The coupler 16 is fixed in place by the hook 13a of the coupling arm 13 which is fitted in a hole 16b defined in the coupler 16.

Figure 5:
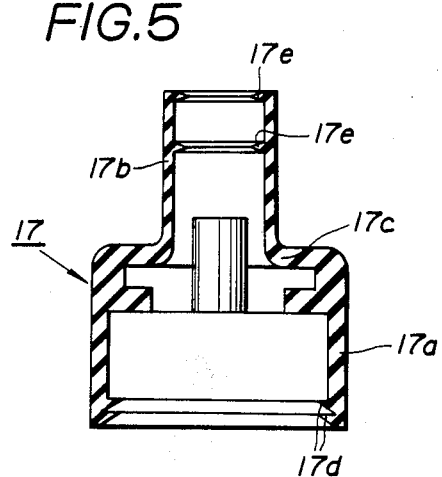
FIG. 5 is a horizontal cross-sectional view of a cover.
Figure 6:
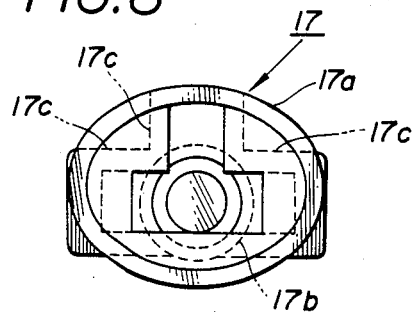
FIG. 6 is an end elevational view of the cover as seen from a connector thereof.

As shown in FIG. 1 and 6, a cover 17 made of rubber comoprises a tubular member 17a of an elliptical cross section to be fitted over the tubular member 9b, a sleeve 17b for insertion through the hole thereof a wire tube (not shown) with wires extending therethrough, and a housing 17c accommodating the outer end of the coupler 16 and the coupling arm 13 therein. The cover 17 as it is attached to the terminal holder 9 makes the same water-resistant. As shown in FIG. 5, two ridges 17d are disposed fully circumferentially on the inner surface of the tubular member 17a closely to the open end thereof, and two ridges 17e are disposed fully circumferentially on the inner surface of the sleeve 17b closely to the open end thereof. These ridges 17d, 17e as they engage the tubular member 9b and the wire tube serve to achieve a reliable water-resistant ability.

The electric component can be assembled as follows: The flasher relay circuit is housed in the space $S_1$ in the casing 7, and the terminal holder 9 is mounted in the opening 7a. At this time, the ridges 7b on the casing 7 are snapped in the respective engagement grooves 10 in the board 9a, and the electric terminals 12 connected to the flasher relay circuit are threaded through slits 9a-1 (FIG. 11) into the terminal space $S_2$. Then, the mass 15 of epoxy resin is applied to provided a seal between the casing 7 and the board 9a. Thereafter, the female coupler 16 is mounted in the terminal holder 9, and a male coupler (not shown) attached to the ends of the wires is connected to the female coupler 16. Finally, the cover 17 is fitted over the tubular member 9b.

With the aforesaid construction of the electric component, air is introduced and discharged through the vent holes 14, the wire tube, and a main harness (not shown) only when there is a pressure difference between the interior and exterior of the casing due to the expansion and contraction of air in the space $S_1$ in the casing 7. More specifically, air expanded due to the heating in the casing 7 is moved out of the casing 7 through the wire tube. Under normal conditions in which there is no substantial pressure difference between the exterior and interior of the casing 7, the casing 7 is substantially hermetically sealed and does not draw in salt and/or water when it is heated or cooled. Since the electric terminals 12 are guided by the female coupler 16 and covered with the cover 17, no salt, water, mud, or other foreign matter will be attached directly to the electric terminals 12.

Figure 7:
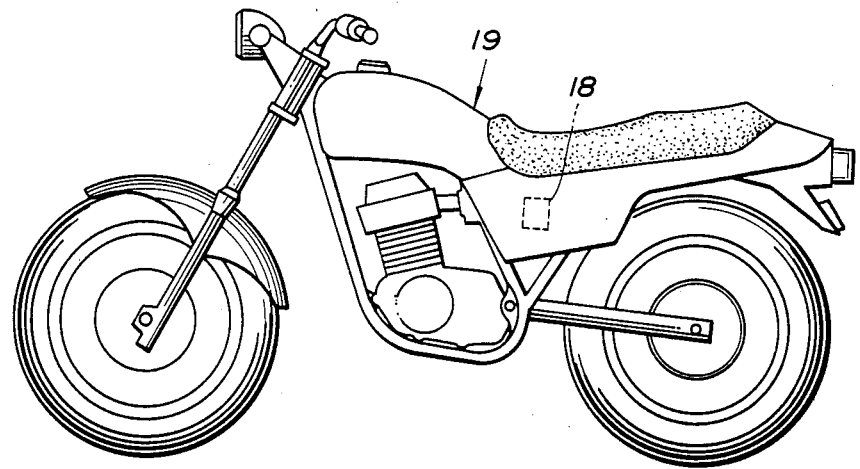
FIG. 7 is a side elevational view of a motorcycle showing a position where the electric component of the present invention is to be installed.
Figure 8:
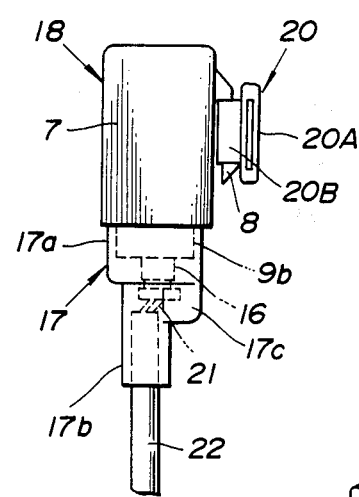
FIG. 8 is a side elevational view of the electric component, showing the manner in which it is attached.
Figure 9:
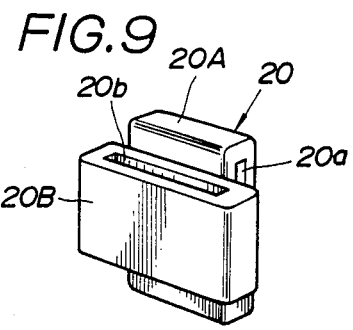
FIG. 9 is a perspective view of an attachment.

As shown in FIG. 7, the electric component, denoted at 18, may be disposed in a space in a motorcycle 19 in the vicinity of an air cleaner. The electric component 18 may be fixed to the motorcycle frame by employing an attachment 20 of rubber as shown in FIG. 9. The attachment 20 has two flat annular bodies 20A, 20B integrally joined together with their respective holes 20a, 20b opening in orthogonal directions. As shown in FIG. 8, the annular body 20A attached to the motorcycle frame, and the hook 8 of the electric component 18 is inserted in the annular body 20B with the cover 17 directed downwardly. In FIG. 8, the wires are denoted at 21 and the wire tube is denoted at 22.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. An electric component for use in a motor vehicle comprising:
   a casing containing a relay circuit therein and having an opening;
   a terminal holder having a rounded surface and being fixed at the opening of said casing in a manner such that said terminal holder projects outwardly;
   a coupling arm fixed within and projectiang outwardly out of said terminal holder;
   a filling material filled in a clearance between said opening and said terminal holder;
   an electric terminal positioned within said terminal holder and connected to said relay circuit;
   a vent hole provided in a clearance between the inner periphery of said terminal holder and said electric terminal, said vent hole communicating to the inside of said casing;
   a coupler having a hole therein, said hole being adopted to receive an electric wire in one end and said hole said electric terminal in its other end, said coupler further provided with an engagement portion engaged with said coupling arm; and
   a flexible cover covering said terminal holder and said coupler, and being adapted to cover a short length of an electric wire.

2. An electric component according to claim 1, wherein said terminal holder is a tubular member having a substantially elliptical cross-section.

3. An electric component according to claim 2, wherein said flexible cover has a tubular member of substantially elliptical section fitted over said tubular member of the terminal holder, a sleeve having a hole through which a wire can extend in a fluidtight manner into said tubular member of the cover, and a housing adapted to accommodate the outer end of said coupler. and the coupling arm therein.

4. An electric component according to claim 1, wherein said terminal holder includes a board closing said opening of the casing in an airtight manner and, said tubular member projects from said board.

* * * * *